United States Patent [19]

Adkison

[11] Patent Number: 4,718,146
[45] Date of Patent: Jan. 12, 1988

[54] APPARATUS FOR SAWING TURKEY BREASTS AND OTHER OBJECTS

[75] Inventor: Frank L. Adkison, Winfield, Iowa

[73] Assignee: Oscar Mayer Foods Corporation, Madison, Wis.

[21] Appl. No.: 5,417

[22] Filed: Jan. 20, 1987

[51] Int. Cl.⁴ .............................................. A22C 21/00
[52] U.S. Cl. ........................................... 17/52; 17/11; 83/72; 83/77; 83/367
[58] Field of Search .................... 83/77, 72, 363, 367, 83/732; 17/11, 52

[56] References Cited

U.S. PATENT DOCUMENTS

| | | | |
|---|---|---|---|
| 4,065,911 | 1/1978 | Fagan | 83/77 |
| 4,270,243 | 6/1981 | Lewis | 17/11 |
| 4,441,537 | 4/1984 | Vartiainen | 83/732 X |

*Primary Examiner*—Willie G. Abercrombie
*Attorney, Agent, or Firm*—J. T. Harcarik; T. R. Savoie; D. J. Donovan

[57] ABSTRACT

A conveyorized machine that operates to automatically advance objects of generally the same shape and weight, particularly breasts of turkey, to a scale platform which is retractable below the conveyor and elevatable above the conveyor. On the scale platform the object is automatically positioned to a desired location relative to a vertically running band saw blade. In one mode of the machine the desired location will result in the object being sawed or severed into two portions of equal weight. In another mode the desired location will result in the object being sawed or severed into one portion of a predetermined weight and a second portion being the remainder of the object. After the object has been positioned in the desired position on the scale platform, the platform retracts or lowers below the level of the conveyor and the object is then conveyed past the band saw blade and the resulting two severed portions are conveyed to the discharge end of the machine. Preferably, a hold-down mechanism is provided to securely hold the object in its desired position on the conveyor as it passes by the saw blade.

15 Claims, 12 Drawing Figures

APPARATUS FOR SAWING TURKEY BREASTS AND OTHER OBJECTS

This invention relates generally to improvements in machines for automatically severing into two portions objects which correspond generally to each other in respect to shape and weight. More specifically, the invention relates to machines for automatically severing breasts of turkey of about the same weight into either two portions of equal weight or into one portion of predetermined weight and a left-over or remaining portion.

A substantial market exists for fresh and frozen breasts of turkey cut into two portions, a whole turkey breast being too large for the average customer. At least one machine is known that has been used commercially to cut turkey breasts into two portions of approximately equal weight depending upon the skill of the operator. This known machine includes a horizontal conveyor which passes on both sides of a vertical band saw blade. An operator places a turkey breast on the feed end of the conveyor in a location between the sides of the conveyor which the operator estimates will result in the turkey breast being severed into two portions of the desired weight. The accuracy of the results will depend on the skill of the operator but at best will vary considerably. Accordingly, an unfulfilled need exists for a machine which will operate automatically to accurately cut or sever turkey breasts into two halves of equal weight or into one portion having a predetermined weight with the other portion being the remainder of the breast.

While at present the invention will fulfill a demand in sawing turkey breasts it has utility for sawing other products and objects including various primal cuts of meat such as loins and hams as well as non-meats objects such as watermelons, bread loafs, etc.

The object of the invention generally stated, is the provision of a practical machine which can be operated by unskilled labor to automatically sever various objects, and specifically breasts of turkey, into either equal weight halves or into one portion of a predetermined weight and a remaining portion. A further object is such a machine which can be readily set up to operate in either the mode in which the objects or breasts are severed into portions of equal weight or in the mode yielding a portion of predetermined weight and a remainder portion.

An important object of the invention is the provision of a severing or sawing machine which upon placement one at a time, of a series of objects of generally the same shape and weight such as breasts of turkey, on the feed end of a conveyor will automatically advance each breast or object in increments, first to an elevatable and retractable scale platform whereupon each object or breast is aligned in one of two pre-set relationships with a vertically running saw blade, each aligned object or breast is then conveyed past the saw blade and severed into two portions thereby, and thereafter the severed portions are discharged from the discharge end of the conveyor, one of the pre-set relationships aligning the center of gravity of each object or breast with the saw blade and the other pre-set relationship resulting in each object or breast being cut into two portions of unequal weight with one portion being of predetermined weight.

Certain other objects of the invention will be apparent from the following detailed description of the invention taken in connection with the accompanying drawings, wherein.

Figure 1:
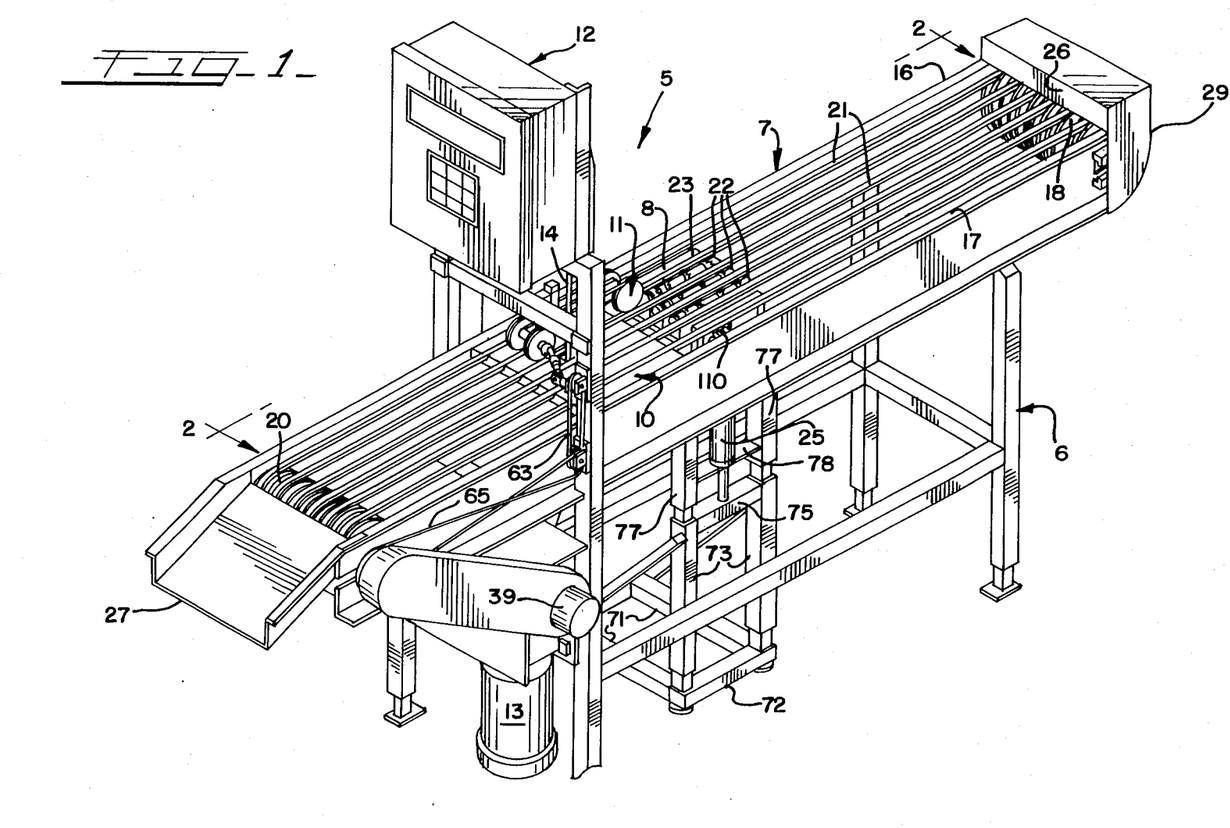
FIG. 1 is a perspective view of a presently preferred working embodiment of the invention viewed from the discharge end.

Referring to FIG. 1, a machine for sawing or severing breasts of turkey is indicated generally at 5 which includes the following generally indicated subassemblies and components: a frame 6, a conveyor 7, a scale platform subassembly 8, a cutting board 10, a hold down mechanism 11, a controls console 12, and a conveyor and saw drive motor 13. A vertically running band saw blade 14 is also shown in FIG. 1, the band saw itself being indicated generally at 15 in FIG. 3.

The conveyor 7 includes a frame having parallel side members 16 and 17 supporting therebetween a non-driven feed end pulley assembly 18 and a driven discharge end pulley assembly 20. The conveyor surface is provided by the upper runs of a plurality of V-belts 21—21 which at their opposite ends run in the V-grooves in the pulleys of the subassemblies 18 and 20.

The scale platform subassembly 8 includes three driven rollers 22—22 and a non-driven or idler roller 23. The rollers 22 and 23 are aligned parallel to the direction of travel of the upper runs 21 of the conveyor 7 and positioned intermediate these runs so as to be elevatable above the runs and retractable downwardly beneath the runs by operation of a double-acting air cylinder 25 and support mechanism to be described below.

The control mechanism or system for the machine 5 is programmed to advance the conveyor 7 in forward increments of 9.5 inches or other suitable distance. The operator places a breast of turkey on the feed end of the conveyor 7 up against the vertical member 26 of a guard fixture 29 and to the left side of the conveyor as viewed in FIG. 1, preferably when the conveyor mechanism is stopped in between advancing increments. Each breast of turkey is then advanced in increments (e.g., 9.5 inches) until each breast in turn is brought over the scale platform subassembly 8. Each time a breast of turkey is positioned over the scale platform subassembly 8 it is elevated by actuation of the cylinder 25 thereby allowing the scale platform assembly to lift the breast of turkey off the conveyor belts 21.

The control system operates in such a way that it senses both the weight of the breast of turkey on the scale platform 8 and also the relative position of the center of gravity thereof. The control system can be set to operate in either of two modes. In one mode, the rollers 22 are rotated so as to move the breast of turkey from the left hand side of the conveyor (as viewed in FIG. 1) toward the right until the center of gravity of the turkey breast is in direct fore-and-aft alignment with the saw blade 14. Thereupon the rollers 22 are stopped and the scale platform 8 is lowered or retracted beneath the level of the belts 21 depositing the breast thereon and allowing the breast of turkey to be moved by the conveyor belts 21 over the cutting board 10 and underneath the hold down and guide mechanism 11. The breast of turkey is then sawed or severed into two pieces of equal weight which are advanced in increments (e.g., 9.5 inches) until they reach the unloading chute 27. The control system 12 can also be set in a second mode wherein the drive rollers 22 will shift a breast of turkey from left to right until the portion of the breast lying to the left of a fore-and-aft vertical plane including the saw blade 14 has a predetermined weight (e.g., 1.75 pounds). At that point the shifting of the breast of turkey is arrested, the scale platform 8 lowered below the surfaces of the conveyor belts 21 and the turkey breast is advanced past the saw blade 14 whereby it is severed or cut into one piece of predetermined weight and a second piece comprising the balance of the breast.

Having described the general construction and operation of the machine 5, the several subassemblies and components thereof will now be further described.

Conveyor Subassembly

The drive shaft 31 (FIGS. 3 and 11) of the electric motor 13 carries a sprocket 32 over which runs an upwardly extending chain 33 which runs over and drives a sprocket 34 keyed to a jack shaft 35 journaled in bearings 36, 37 and 38 carried by the frame. By mounting the motor 13 on the vertically adjustable plate 14 the tension on the chain 33 may be readily adjusted. An air clutch 39 of known type such as a Horton Air Clutch, is mounted on the projecting end of the shaft 35. The clutch 39 includes a sprocket 29 which is free to rotate relative to the shaft 35 and over which runs a drive chain 40 which runs upwardly over a sprocket 41 mounted on one end of the conveyor drive shaft 42. The shaft 42 extends across the discharge end of the conveyor 7 and is supported at its opposite ends in bearings 43—43 mounted on the conveyor side members 16 and 17. A plurality of pulleys 44—44 are keyed on the shaft 42 and separated from each other by a plurality of spacer collars 45—45. It will be seen that the pulleys 44 on the shaft 42 comprise the driven pulley assembly 20 of the conveyor 7 with each of the V-belts 21—21 running over one of the pulleys 44.

As previously mentioned, the control system for the machine 5 is such that the air clutch 39 is intermittently engaged and disengaged so that the conveyor belts 21 are in turn intermittently advanced and stopped. From the foregoing it will be apparent that when the clutch 39 is engaged the pulleys 44 are driven whereas when the clutch is disengaged the pulleys are stationary.

Band Saw Subassembly

Figure 2:
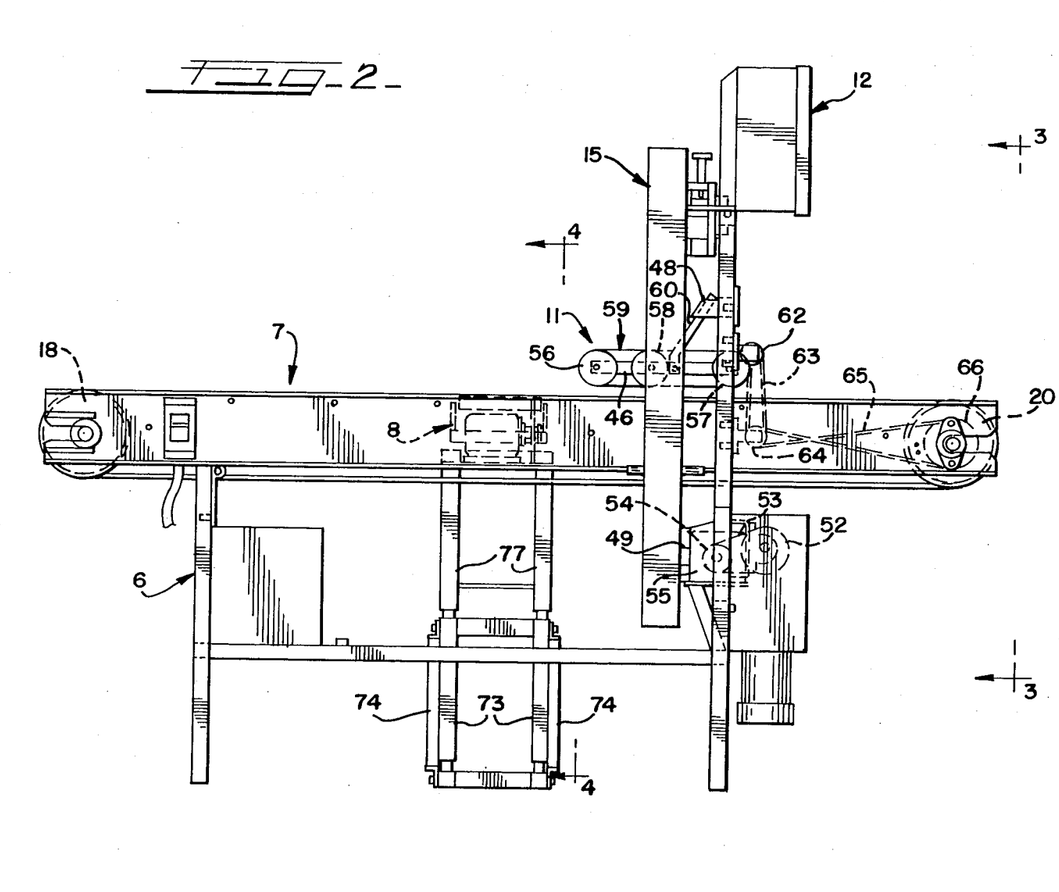
FIG. 2 is a left side elevation of the machine taken on line 2—2 of FIG. 1, a guard fixture being removed from the feed end and an unloading chute being removed from the discharge end.
Figure 3:
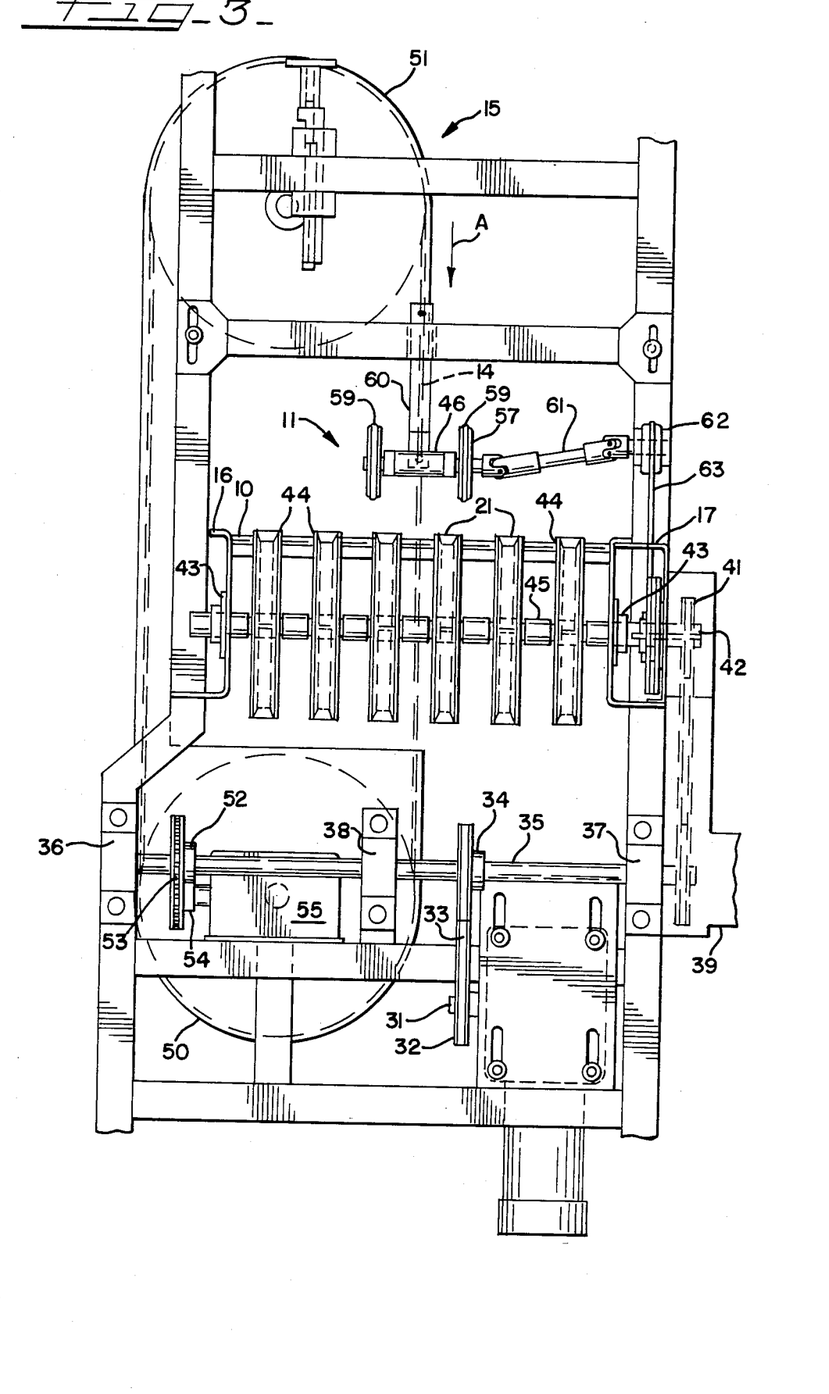
FIG. 3 is an end elevation of the feed end of the machine taken on line 3—3 of FIG. 2.
Figure 11:
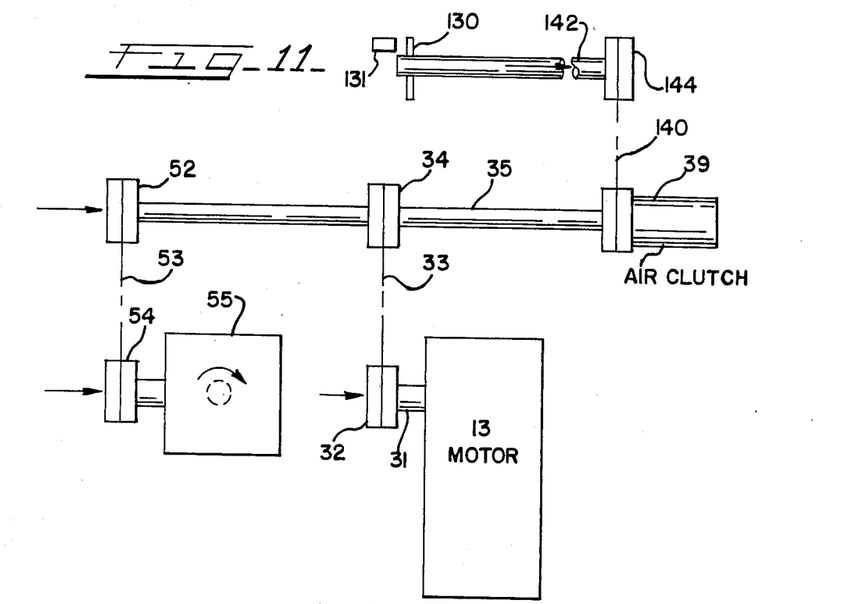
FIG. 11 is a schematic diagram showing the power train by which the conveyor band saw, and object hold down subassemblies are driven.

Referring to FIGS. 2, 3 and 11 the band saw 15 comprises a driven bottom pulley 50 and a upper non-driven pulley 51 over which the band saw blade runs in known manner in the direction indicated by the arrow A. The lower pulley 50 is continuously driven from the jack shaft 35 by a sprocket 52 over which runs a chain 53 to a sprocket 54. The sprocket 54 is mounted on the input shaft of a gear box 55 for the band saw 15. The output shaft 49 (FIG. 2) of the gear box 55 drives the pulley 50 in known manner so that the saw blade 14 is continuously driven in the direction indicated by the arrow A in FIG. 3.

The band saw blade runs vertically downwardly through a slot provided therefore in the saw table 10 (FIGS. 1 and 3) the upper surface of which is disposed immediately beneath the under sides of the conveyor belts 21 so as to firmly support the belts as they pass thereover as well as the turkey breasts or other objects which are being conveyed and sawed by the blade 14.

Hold Down Mechanism

The hold down mechanism 11 (FIGS. 1-3) comprises a pair of leading pulleys 56, a pair of trailing pulleys 57, and a pair of intermediate pulleys 58 over which run a pair of hold down belts 59 (FIG. 2). The sets of pulleys 56, 57 and 58 are aligned in a fore-and-aft direction corresponding to the direction of movement of the conveyor belts 21 and are rotatably carried in an elevated position on a support frame 46.

The support member 46 is pivotally carried on the lower end of an inclined support 60 which can slide up and down in a support 48. The weight of the hold down subassembly 11 tends to hold down objects passing thereunder. The hold down pulleys 56, 57 and 58 are grooved and the pair of V-belts 59 run over the same with the shaft on which the rear pulleys 57 are mounted being driven by means of an articulated shaft 61 (FIG. 3). The shaft 61 is driven off of a pulley 62 which in turn is driven by a belt 63 running over a pulley 64 (FIG. 2) which in turn in driven by a belt 65 which runs over a pulley 66 (FIG. 2) keyed to the conveyor drive shaft 42.

The drive arrangement for the hold down mechanism 11 is such that the belts which run over the sets of pulleys 56, 57 and 58 have the same lineal speed as the V-belts 21 so that there is no relative movement between the hold down belts 59 and a turkey breast or other object which is held down by the belts as it passes over the saw table 10.

Scale Platform Subassembly

Figure 4:
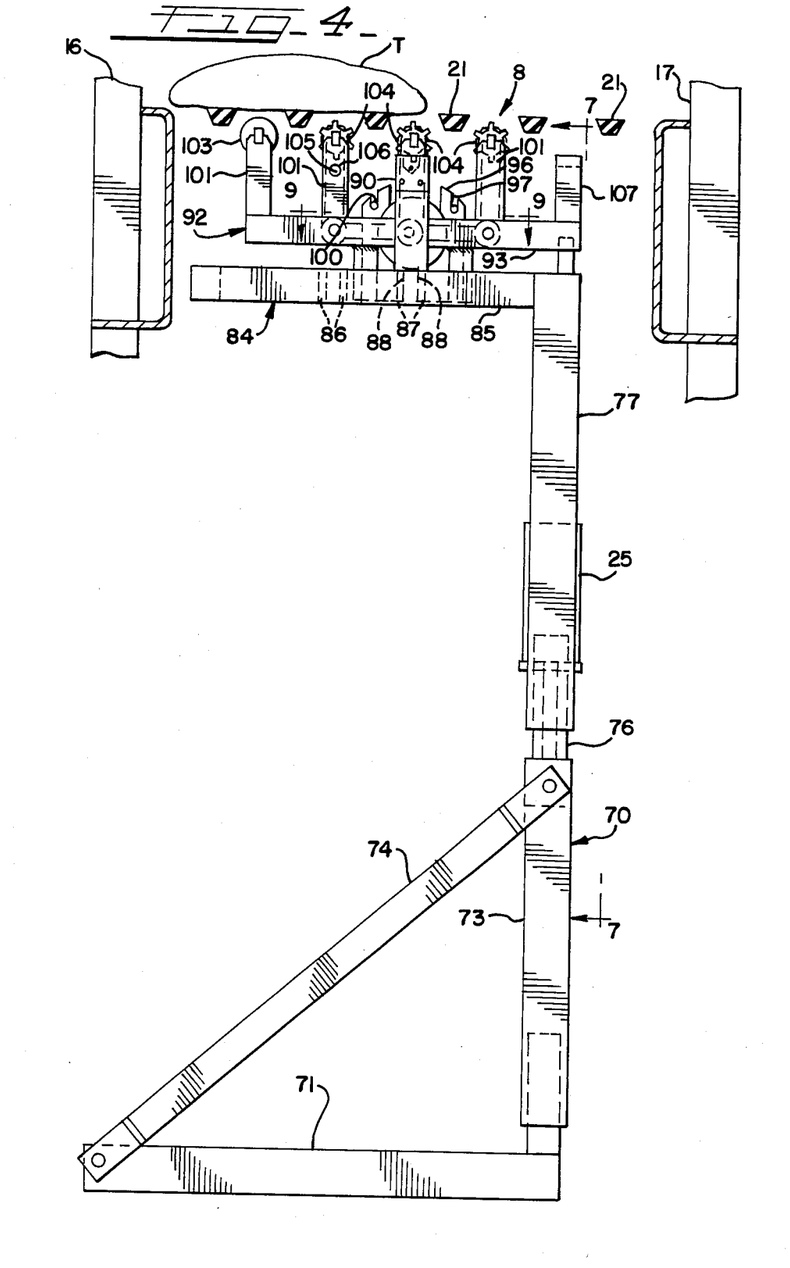
FIG. 4 is a vertical section on enlarged scale taken on line 4—4 of FIG. 2 with a scale platform subassembly forming part of the machine being shown in its lowered or retracted position relative to the upper run of the conveyor the bottom return run being omitted.
Figures 5, 6:
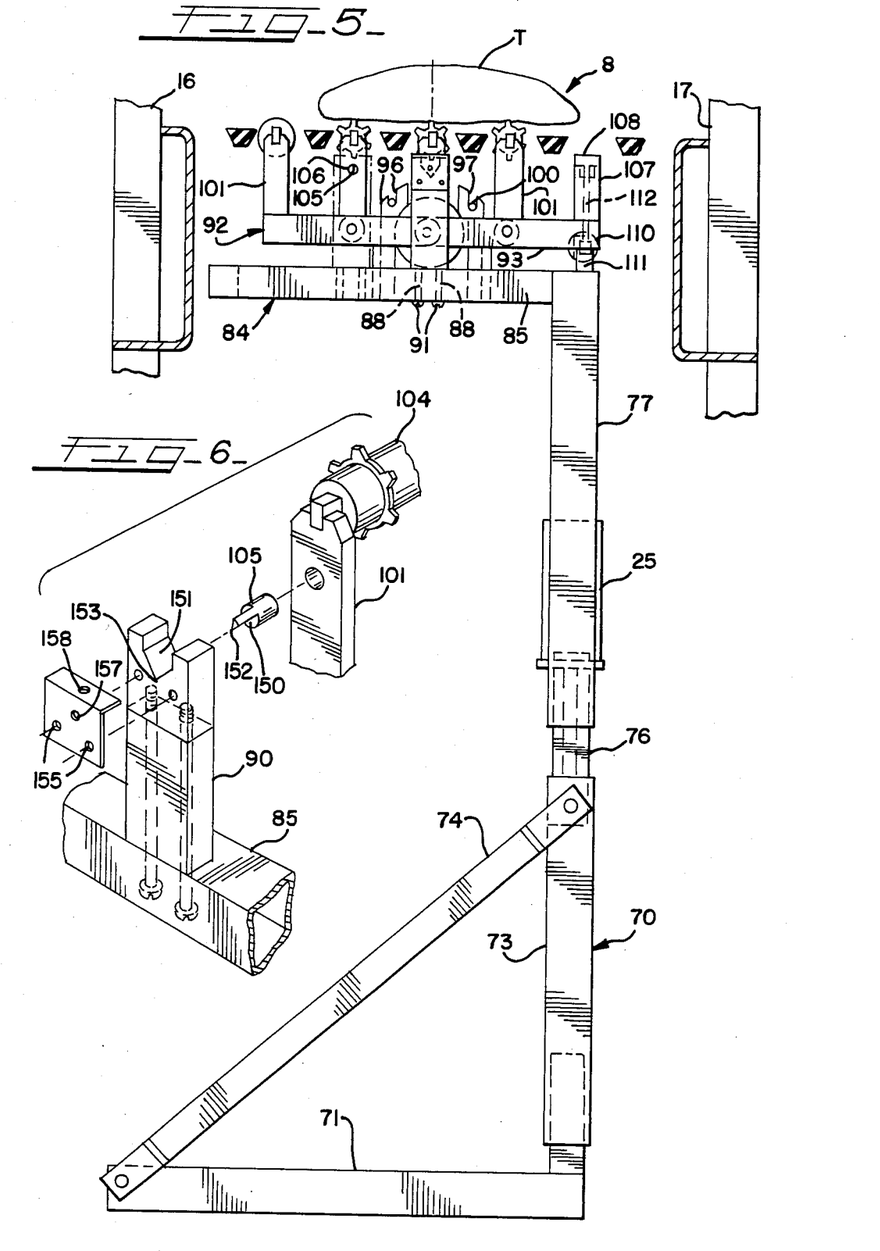
FIG. 5 is a vertical section corresponding to FIG. 4 but showing the scale platform subassembly in its elevated position relative to the conveyor.
FIG. 6 is an exploded detail perspective on enlarged scale showing a knife-edge pivot means utilized in the scale platform assembly.
Figure 7:
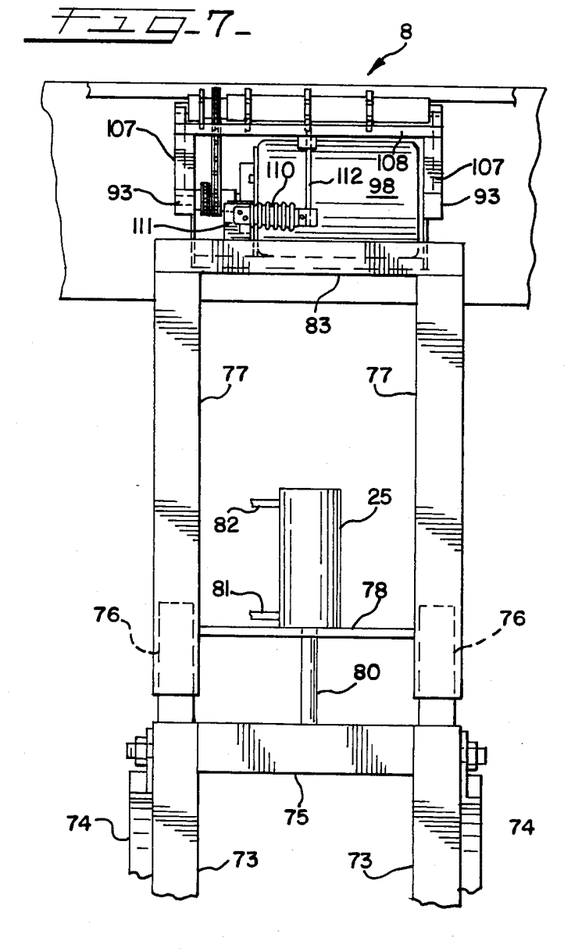
FIG. 7 a fragmentary side elevation taken on line 7—7 of FIG. 4.

The details of the construction and operation of the scale platform subassembly 8 will be apparent from the following description thereof taken in connection with FIGS. 4-10. In FIGS. 4, 5 and 7 the fixed frame support for the subassembly is indicated generally at 70 and includes a pair of transverse horizontal members 71—71 interconnected by a horizontal cross member 72 (FIG. 1) from opposite ends of which two vertical posts 73—73 are supported. The upright position of the posts 73 is maintained by the braces 74—74. The upper ends of the posts are interconnected by a cross member 75 and extensions 76—76 extend vertically upward from the upper ends of the posts 73.

Vertically telescoped over the extensions 76 are the hollow lower ends of a pair of upright supports 77—77 of a rigid frame. A horizontal shelf 78 (FIG. 7) extends between the lower ends of the uprights 77 and serves as the support for the double-acting air cylinder 25. The piston rod 80 of the air cylinder 25 projects downwardly and is anchored to the cross member 75. The air cylinder 25 is provided with suitable connections 81 and 82 adjacent its lower and upper ends (FIG. 7) through which compressed air or other fluid under pressure can alternately be introduced and exhausted in the well known manner in which double-acting air cylinders are operated.

At their upper ends the upright members 77 are interconnected by a side member 83 (FIG. 7) of a rigid rectangular scale platform 84 which is supported in cantilevered fashion from the uprights 77 as shown in FIGS. 4 and 5. The two side members of the rectangular support 84 which extend transversely to the direction of movement of the conveyor belts 21 are indicated at 85—85 and each is provided with a set of vertical holes 86—86 and 87—87 which accommodate anchoring bolts 88—88 which project upwardly through holes in upright posts 90—90 which rest on the top sides of the members 85. The heads 91—91 on the lower ends of the bolts 88—88 engage the underside of the members 85. The threaded upper ends of the bolts 88 extend through holes in the posts 90 into tapered holes in the bottoms of caps 47 thereby securing the posts 90 firmly assembled in place, either in the opposing pairs of vertical holes 87—87 or upon removal and resetting in the opposing holes 86—86. The aligned upstanding posts 90—90 serve to pivotally support a tiltable scale platform indicated generally at 92. The platform 92 comprises a rectangular frame composed of side members 93—93 extending transversely to the length of the conveyor 7 and interconnected at their ends adjacent the conveyor side 16 by a cross member 94 and at their ends adjacent the side frame member 17 by an upstanding inverted U-shaped frame comprised of posts 107—107 (FIG. 6) interconnected by a cross member 108.

Extending midway between the side members 85—85 of the rigid frame 84 are a pair of horizontal motor support members 95—95 (FIGS. 9 and 10) which in turn support an upstanding motor mount 96 which is provided with three bolt-receiving slots 97—97. A motor 98 is supported on the motor mount 96 by sets of headed support bolts 100—100 which set in the slots 97—97.

Each of the tiltable scale platform side members 93 is provided with four upstanding roller support posts 101—101. The upper end of each of the posts 101 is provided with a notch for receiving the squared ends 102—102 projecting from opposite ends of the spindles on which a plurality of rollers are mounted. One of these rollers which is indicated at 103 has a smooth surface in an idler roller. Each of the other three rollers 104—104 is a driven roller and provided with circumferential bands of teeth or protuberances 105—105.

The opposing pair of upright support posts 101 that are in the middle and the pair of support posts 101 that are adjacent one end of the tiltable platform 92 are provided with holes for receiving outwardly projecting pins 105—105 which pivotally project into openings 106 provided therefore in the vertical support posts 90—90.

A preferred knife edge pivot support is shown in FIG. 6. The projecting end of each pin 105 is machined so as to provide a wedge-shaped projection 150. These projections 150 rest in the V-shaped openings 151 in the cap members 47 with knife edge 152 on each projection 150 engaging the nadir edge 153 in each opening 151. Each pin 105 may be secured in its proper orientation with respect to posts 101 by means of a set screw. The projections 150 may be maintained within the V-openings 151 by cover brackets 154 secured to the caps 47 by screws inserted through holes 155—155 and threaded into the tapped openings 156—156. Threaded holes 157 and 158 are provided in the covers 154 so as to properly limit the horizontal and vertical movement of the projections 150 without restrictive engagement.

The pair of vertical posts 107—107 project upwardly from opposite ends of the side frame members 93 of the tiltable frame 92 which are opposite the end on which the smooth idler roller 103 is supported. The upper ends of these upright posts 107 are interconnected by the cross member 108. A load beam 110 is supported in a horizontal position from adjacent one end by a block 111 (FIGS. 7 and 8) supported on the rigid cross member 83. The load beam 110 projects in cantilever fashion from the support block 111 and the outer end thereof is interconnected by a link 112 (FIG. 7) to the horizontal cross member 108. With this arrangement it will be seen that when the tiltable scale platform 92 tends to be tilted or pivoted on the knife edges thereby also tending to pivot the cross member 108, the tilting force in either direction will be applied to the outer cantilevered end of the load beam 110. This load beam 110 is of known type and produces an analog signal which is responsive to the direction and magnitude of the force supplied to its cantilevered end through the link 112. This signal is digitized and used to control the automatic operation of the scale platform 8 as will be further described below. One commercial load beam or load cell 112 which has been found to function satisfactorily is an Alpha fifty newton capacity.

Figure 8:
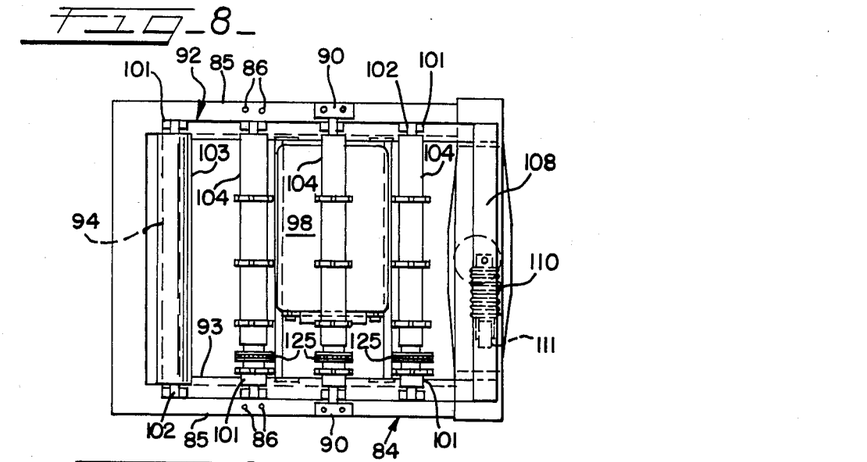
FIG. 8 is a top plan view of the scale platform taken on line 8—8 of FIG. 4.
Figure 9:
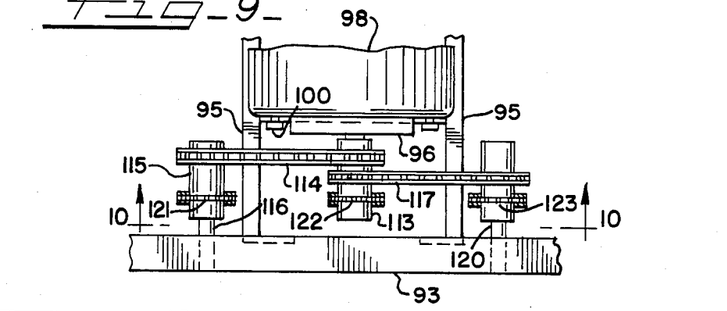
FIG. 9 is a fragmentary detail plan view taken on line 9—9 of FIG. 4.
Figure 10:
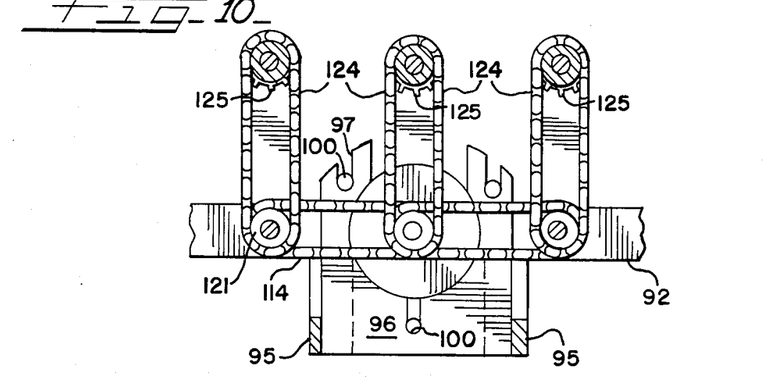
FIG. 10 is a fragmentary detail elevation taken on line 10—10 of FIG. 9.

The rollers 104 are arranged to be driven or rotated in unison in the same direction by the motor 98 through a system of chains and sprockets which will be described in connection with FIG. 8-10. The drive shaft of the motor 98 carries a sleeve 113 (FIG. 9) which is keyed to the drive shaft and on which are mounted three sprockets in axial alignment. A chain 114 (FIG. 9) runs over the innermost sprocket to a sprocket carried on the inner end of a sleeve 115 rotatably mounted on a spindle 116 projecting inwardly from the adjacent side frame member 93 of the tiltable scale platform 92. In like manner, a chain 117 runs over the intermediate sprocket on the sleeve 113 to the inner sprocket mounted on a sleeve 118 rotatably mounted on the spindle 120 projecting from the adjacent side frame member 93. In this manner it will be seen that the sleeves 115 and 118 are driven by the motor 98.

Each of the sleeves 115 and 118 also carries a second sprocket and a motor drive sleeve 113 and also carries an outer sprocket with all of these three sprockets being aligned with one another. These three sprockets are indicated in FIGS. 9 and 10 at 121, 122 and 123. Chains 124—124 are driven by and extend upwardly from the sprockets 121—123 to sprockets 125—125 mounted on the adjacent ends of the rollers 104. In this manner each of the rollers 104 is driven and rotated in the same direction by means of the motor 98 when the latter is energized.

Scale Platform

The operation of scale platform subassembly 8 has been briefly described above in connection with FIG. 1. By way of a more detailed description, the operator of the machine 5 loads it from the feed end by placing objects to be cut or sawed, e.g., turkey breasts one at a time, on the conveyor belts 21 when they are stopped with the object backed against the cross member 26 and over to the left hand side of the conveyor adjacent the side member 16. The objects are then sequentially advanced in increments (e.g., 9.5 inches) with each object in turn arriving at and being stationarily positioned over the scale platform 8 while resting on the conveyor belts 21 as shown in FIG. 4. In FIG. 4 a turkey breast is indicated at T and it will be noted that the crests of the smooth non-driven roll 103 and of the driven rollers 104 are beneath the top surfaces of the belts 21.

On actuation of the double-acting cylinder 25 the piston rod 80 thereof remains stationary while the cylinder itself lifts carrying with it the vertical frame members 77 and the rigid scale platform support 84 carried thereby. As the vertical side posts 90 are raised along with the frame 84 they cause the tiltable scale platform 92 to lift and the top surfaces of the rollers 103 and 104—104 will rise above the upper surfaces of the belts 21 and engage the underside of the turkey breast T and lift off the belts 21. At this point, the motor 98 will be running thereby rotating the rollers 104.

As the toothed members 105 on the driven rollers 104 engage the underside of the turkey breast T they shift it from the left side position as viewed in FIG. 4 towards the right as viewed in FIG. 5. With the scale subassembly 8 set up in the condition shown in FIGS. 4 and 5 and with the vertical support posts 90 secured to the middle pair of holes 88—88 the turkey breast T will continue to move from left to right as viewed in FIGS. 4 and 5 until the center of gravity of the turkey breast T is directly over the knife edges 122 and 123.

It will be seen that during the shifting of the turkey breast T from left to right the tension applied to the free end of the load beam 110 through the linkage 112 will decrease. The signal generated by the load beam 110 will in turn progressively change as the turkey breast T is shifted. This signal is compared to the reference signal generated by the load beam 110 prior to its loading with the turkey breast. When the load beam signal equals the reference signal, the tiltable scale platform 92 is balanced on the knife edges 152 and the center of gravity of the turkey breast T is directly thereover.

The analog signal from the load beam 110 is digitized 60 times per second when the load beam is of the type above mentioned. When the digital load beam signal equals the pre-set reference value whereat the scale platform 92 and the load thereon are balanced, the control system immediately stops motor 98 and simultaneously actuates the double-acting air cylinder 25 to lower the entire scale platform assembly to its retracted position shown in FIG. 4 whereat the turkey breast T again rests on the conveyor belts 21 in the position shown in broken line whereat its center of gravity is directly aligned fore-and-aft with the vertical plane of the band saw blade 114. The control system now reactivates the conveyor 7 resulting in each accurately positioned turkey breast T being advanced underneath the hold down mechanism 11 and fed past the band saw blade 114 while being supported on the saw table 10.

As previously mentioned there may be a demand for sawing turkey breasts or other objects into two portions which are not of equal weight. Instead the demand may be for cutting a turkey breast or other objects into two portions one of which will have a predetermined definite weight. In order to fulfill this demand, the scale platform subassembly 8 is set in a different mode wherein the vertical posts 90 are removed from the attaching holes 88 in the side beams 85 and shifted over to the holes 86. At the same time the pins 105 are shifted to the adjacent supports 10 for a roller 104. The knife edge pivot points will now be shifted out of fore-and-aft alignment with the band saw blade 14. The control system is also reset so that when the right hand boundary (as viewed in FIGS. 4 and 5) of a portion of predetermined weight is in fore-and-aft alignment with the saw blade 114 the value of the signal generated by the load cell 112 will equal a pre-set value of the control and the motor 98 will be deenergized and the scale assembly 8 lowered as above described. Thereafter, when the object is conveyed past the saw blade it will be severed along the desired boundary producing one piece of predetermined weight and a second remainder piece which will vary in weight depending upon the weight of the object or turkey breast being sawed.

Referring to FIG. 11, a wheel 130 having five equal spaced spokes is mounted on the conveyor drive shaft 35. The outer end of each spoke of the wheel 130 passes in close proximity to a switch 131 of known type which incorporates an electric eye which produces a signal each time a spoke passes by. The microprocessor in the control system is set so that after two spokes pass by it actuates the system when the next spoke passes so as to initiate a new cycle of the machine 5. The manner in which the machine 5 cycles will be further understood by reference to FIG. 12. The machine 5 is connected with a source of air pressure indicated at 135 with the incoming line being provided with a air pressure gage 136 and a lubricator 137. The line 135 has one offtake 138 connected to the inlet port of a solenoid actuated valve of known type indicated at 140. A second offtake 141 from the line 135 communicates with the inlet port of a second solenoid control valve 142. The solenoid valves 140 and 142 may be of known type such as Heroin Four-Way Solenoid Valves. The connections 81 and 82 to opposite ends of the air cylinder 25 are connected with the valve 140 and include full control valves 143 and 144 of known type. By this arrangement air pressure can alternately be introduced into the lower end of the cylinder 25 and exhausted from the upper end through line 82 and then pressure applied through line 82 to the upper end and exhausted through line 81.

Figure 12:
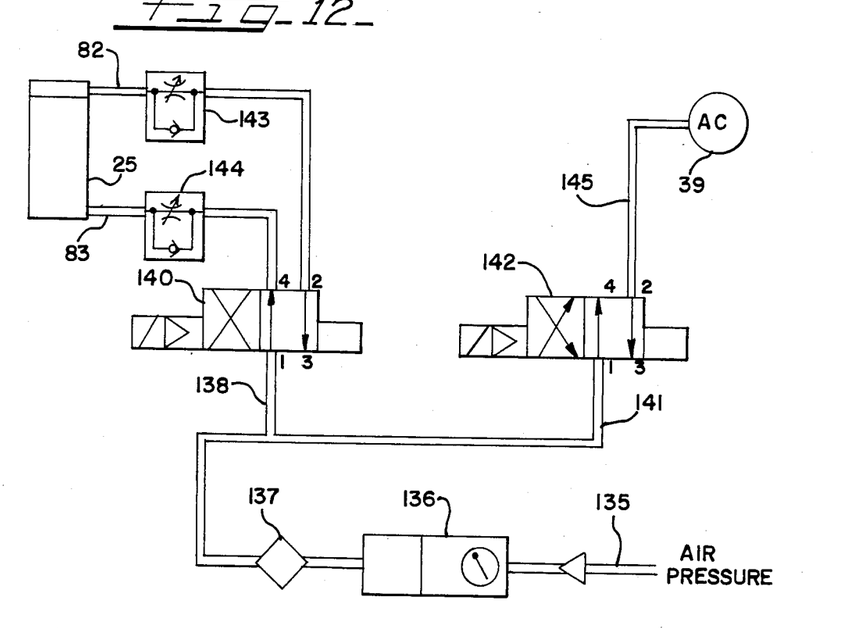
FIG. 12 is a schematic diagram showing the control system for the air clutch in the power trail and the two-way air cylinder which raises and lowers the scale platform assembly.

The valve 142 is connected with the air clutch 39 by way of the conduit 145 and operates to alternately pressurize the air clutch and then relieve the pressure so as to disengage the clutch.

Machine Cycle

With the air clutch 39 being engaged and driving the conveyor and turning the timing wheel 130 the proximity switch 131 will be activated when the spokes passes whereupon the control system will actuate the solenoid valve 142 so as to disengage the air clutch 39 and thereby stop the advancement of the conveyor belts 21 and deactivate the hold down mechanism 11. At the same time the solenoid valve 140 is actuated to introduce pressure into the connection 82 thereby forcing the cylinder 25 upwardly and raising the platform scale subassembly 8 above the belts 21 so as to pick up the turkey breast or other object resting over the platform. At the same time the motor 98 will be energized and cause the turkey breast or other object to be shifted to the predetermined position as described above. When the predetermined position of the object or turkey breast has been reached the microprocessor will then actuate the solenoid valve 140 so as to admit pressure to the two way cylinder 25 through the connection 81 thereby lowering the scale platform subassembly 8. At the same time the solenoid valve 142 will be actuated so as to reengage the air clutch 39 and advance the conveyor 7 another increment. The control mechanism will incorporate a suitable time delay so that the scale platform subassembly will not be elevated until after the air clutch 39 has been disengaged and the conveyor stopped.

The control system contained in the console 12 incorporates microprocessing devices of known type and the control system as such does not form a part of the invention. In fact, the machine 5 could be operated manually by manipulating separate controls if it was so desired. For example, the operator could manipulate a start and stop switch which would engage and disengage so that each turkey breast or other object could be brought into position over the platform scale assembly and then the conveyor stopped by disengaging the hutch 43. By operating a suitable valve the double-acting cylinder 25 could be actuated so as to lift the scale platform assembly and the motor 98 could be energized when the rigid support platform 84 actuates a proximity switch of known type. The operator could then read a meter and immediately manipulate the two-way air cylinder 25 to lower the platform scale assembly as soon as the reading corresponding to a predetermined reading. The operator would then recycle the machine through the same series of operations.

What is claimed is:

1. In combination with a machine for severing a series of objects of generally the same shape and weight into desired portions and comprising, a conveyor having a generally level upper run having a feed end and a discharge end including a plurality of separate parallel spaced belts, a severing mechanism including a vertically running saw blade extending vertically in the space between two of said belts, and driving means operatively connected with said conveyor and severing mechanism, the improvement comprising scale means comprising, in combination:

scale platform means having an object support surface comprised of a plurality of parallel rollers spaced to register with spaces between said belts;

means operatively connected with said scale platform means to elevate said rollers above said conveyor upper run and to retract said rollers below said upper run;

drive means operatively connected with at least a pair of said parallel rollers to rotate said rollers in a common direction which will shift an object resting on said rollers in a direction transverse to the direction of travel of said conveyor upper run;

sensing means operatively connected with said scale platform means and responsive to the weight of an object thereon and the location of the object's center of gravity; and control means operatively connected with said conveyor driving means, with said scale platform means elevating and retracting means, with said roller drive means, and said sensing means whereby when an object to be severed is placed on the feed end of said upper run it is advanced in at least one increment and brought to rest over said parallel rollers, said rollers are elevated to lift said object at rest thereabove off said upper run, said rollers are rotated until said object is shifted into a predetermined desired position relative to said saw blade, said rollers are retracted depositing said object on said upper run, said upper run is advanced in at least one increment to carry said object past said blade and deliver its severed portions to the discharge end of said upper run.

2. The improvement called for in claim 1 wherein said scale platform means comprises a stationary support, a rigid frame, means for mounting said rigid frame on said support and allowing said rigid frame to be raised and lowered, a roller support frame pivotally mounted on said rigid frame and on which said plurality of parallel rollers are mounted, said means for elevating and retracting said rollers being operatively connected with said rigid frame, and said sensing means being operatively connected with said roller support frame so as to be responsive to a force tending to tilt said roller support frame.

3. The improvement called for in claim 2 wherein said plurality of parallel rollers are supported from their opposite ends on posts upstanding from said roller support frame.

4. The improvement called for in claim 3 wherein said upstanding posts are located directly below the spaces between said spaced belts of said upper run.

5. The improvement called for in claim 2 wherein the surfaces of said rollers operatively connected with said roller drive means have surfaces with protuberances which engage an object thereon and shift the object in said direction transverse to the direction of travel of said upper run.

6. The improvement called for in claim 5 wherein one of said rollers is mounted adjacent to one side of said upper run and is an idler roller with a smooth surface.

7. The improvement called for in claim 6 wherein said sensing means is connected to said roller support frame on the side thereof opposite to the side on which said idler roller is mounted.

8. The improvement called for in claim 2 wherein said means for elevating and retracting said rollers is a double-acting fluid actuated cylinder operatively connected with said rigid frame.

9. The improvement called for in claim 2 wherein the means for pivotally mounting said roller support frame on said rigid frame comprise a pair of uprights providing pivot support points aligned in a direction parallel to the direction of travel of said conveyor upper run.

10. The improvement called for in claim 9 wherein said upright may be secured in at least two different positions on said rigid frame so as to provide at least two sets of aligned pivot support points, one set being aligned with said vertically running saw blade and the second set being non-aligned with said blade.

11. The improvement called for in claim 2 wherein said sensing means produces an analog signal which is converted to a digital signal.

12. The improvement called for in claim 2 wherein said drive means operatively connected with at least a pair of said rollers comprises an electric motor mounted on said roller support frame.

13. In the method of severing a series of objects of approximately the same size into two portions by conveying said objects one at a time into engagement with and past a vertically operating blade, the improvement which comprises, advancing the objects on the conveyor in increments and stopping the same in superposed position over a lowered scale platform, raising the platform to lift the superposed object off from the conveyor, shifting the object laterally on the scale platform into predetermined alignment with said blade, lowering the platform sufficiently to deposit the positioned object on the conveyor, advancing the object into severing engagement with said blade, and discharging the severed portions.

14. The improvement called for in claim 13 wherein said predetermined alignment results in the objects being severed into equal weight portions.

15. The improvement called for in claim 13 wherein said predetermined alignment results in each of said objects being cut into two portions one of which has a predetermined weight.

* * * * *